US00RE34094E

United States Patent [19]

Grilliot et al.

[11] E Patent Number: Re. 34,094

[45] Reissued Date of Patent: Oct. 13, 1992

[54] PHYSIOLOGICALLY CONFORMABLE SUSPENDERS FOR FIREFIGHTERS' BUNKER PANTS

[76] Inventors: Mary I. Grilliot; William Grilliot, both of 6577 S. Rangeline, West Milton, Ohio 45383

[21] Appl. No.: 642,650

[22] Filed: Jan. 17, 1991

Related U.S. Patent Documents

Reissue of:

[64] Patent No.: 4,967,421
Issued: Nov. 6, 1990
Appl. No.: 298,414
Filed: Jan. 18, 1989

[51] Int. Cl.[5] ..... A41F 15/00

[52] U.S. Cl. ..... 2/327; 2/326; 2/329; 2/333; 2/334

[58] Field of Search ..... 2/311, 312, 313, 314, 2/315, 316, 317, 320, 321, 322, 323, 325, 326, 327, 328, 329, 330, 331, 332, 333, 334, 336, 340

[56] References Cited

U.S. PATENT DOCUMENTS

| | | | |
|---|---|---|---|
| Re. 9,435 | 10/1880 | Katzenberg . | |
| 41,295 | 1/1864 | Greeley | 2/326 |
| 221,888 | 11/1879 | Williams | 2/326 |
| 277,776 | 5/1883 | Petchaft | 2/334 |
| 339,968 | 4/1886 | Budd . | |
| 638,428 | 12/1899 | Specht | 2/330 |
| 680,558 | 8/1901 | Adams . | |
| 713,659 | 11/1902 | MacWilliam | 2/331 |
| 726,045 | 4/1903 | Goodman . | |
| 755,026 | 3/1904 | MacWilliam . | |
| 782,119 | 2/1905 | Fisher . | |
| 1,274,582 | 8/1918 | Olson | 2/327 |
| 1,292,042 | 1/1919 | Phillips | 2/330 |
| 1,404,719 | 1/1922 | Postl | 2/326 |
| 1,910,131 | 5/1933 | Shields | 2/326 |
| 1,926,751 | 12/1933 | Mix . | |
| 2,030,791 | 2/1936 | Hickok | 2/326 |
| 2,185,400 | 1/1940 | Cohen | 2/334 |
| 4,850,057 | 7/1989 | Schierenbeck | 2/328 |

FOREIGN PATENT DOCUMENTS

| | | | |
|---|---|---|---|
| 660786 | 7/1929 | France | 2/329 |
| 695663 | 12/1930 | France | 2/329 |

*Primary Examiner*—Werner H. Schroeder
*Assistant Examiner*—Jeanette E. Chapman
*Attorney, Agent, or Firm*—Porter, Wright, Morris & Arthur

[57] ABSTRACT

Adjustable fire fighters' suspenders that are physiologically conformable when used with bunker pants. The suspenders are designed for comfort, proper fit, and flexibility in movement that corresponds with the movement of the wearer during normal fire fighting activities. The suspenders include a back sliding loop and elastic straps which have a predetermined limit of stretch at the four ends of the shoulder straps which connect the suspenders to the bunker pants. The suspenders provide an improved distribution of weight and increased support of heavy bunker pants and reduce the problem of "bunker bounce".

3 Claims, 4 Drawing Sheets

PHYSIOLOGICALLY CONFORMABLE SUSPENDERS FOR FIREFIGHTERS' BUNKER PANTS

Matter enclosed in heavy brackets [ ] appears in the original patent but forms no part of this reissue specification; matter printed in italics indicates the additions made by reissue.

FIELD OF THE INVENTION

This invention relates to suspenders to be worn by firefighters with bunker pants.

BACKGROUND OF THE ART

Firefighters' suspenders are a well known product. In the prior art, suspenders traditionally have been made of a heavy duty elastic material. Disadvantages of prior art firefighters' suspenders include the following: the lack of the ability to be adjustable to fit and to be comfortable for a variety of different sized persons; the short life-expectancy of certain elastic materials that are used; the lack of the ability to withstand the rigorous activities encountered in fire fighting activities; discomfort and lack of support to the wearer; the lack of the ability to support heavily loaded or water-soaked pants without the aid of a belt or waist adjustment strap; poor fit which causes the suspenders to slide off of the wearer's shoulders; restricted freedom of movement of the suspender-wearer; and "bunker bounce" caused by the interaction of a weight load on the pants and the elasticity of the suspenders.

Some suspenders of the prior art have been constructed of leather but do not allow the flexibility provided by the movable back of the suspenders of the invention. Also, upon repeated exposure to water, leather may rot and deteriorate.

Suspenders, of course, are well known and various types of suspenders systems are shown, for example, in U.S. Pat. Nos. Re. 9,435; 339,968; 680,558; 726,045; 755,026; 782,119 and 1,926,751. U.S. Pat. No. 339,968 shows strips of leather or rubber passing over a hanger bar, but, inter alia. does not show an assembly of a pivoting back mechanism in conjunction with suspenders used with firefighters bunker pants. Nor does U.S. Pat. No. 339,968 otherwise relate any purpose or mechanism in the suspender construction. Similarly, U.S. Pat. Nos. 723,560 and 2,245,556 show straps passing through hanger bars, but not in the context of a pants suspender.

OBJECTS OF THE INVENTION

It is an object of the invention to provide an adjustable and better fitting, longer lasting, more durable pair of suspenders which are designed for comfort, flexibility and freedom of movement during normal fire fighting activities. It is also an object of this invention to provide suspenders that securely support bunker pants allowing the full natural range of body motion. Another object of the invention is to allow the use of strong, wide, materials to aid in the even distribution of the weight of the pants to which the suspenders have been attached.

Thus, the suspender of the invention reacts interactively with natural body motion to allow full maneuverability and a full range of motion when used with bunker pants. A floating back allows the use of strong, wide non-elastic webbing to distribute pants weight and provide firm support. The suspenders of the invention will not stretch out over time or dig into the shoulders.

In this regard, the response of an elastic suspender to weight or body movement can be "fooled" by an increase in pants weight, i.e. by saturation with water or extra pocket contents. Thus, elastic suspenders will not accurately suspend or conform to physiological movement of the wearer. In contrast, the suspenders of the invention adapt to the body's natural extension during motion, and allow complete motion. The suspenders are not "fooled" into stretching at inappropriate times such as when pants saturate with water or pocket contents are increased.

DESCRIPTION OF THE PREFERRED EMBODIMENT

Figure 1:
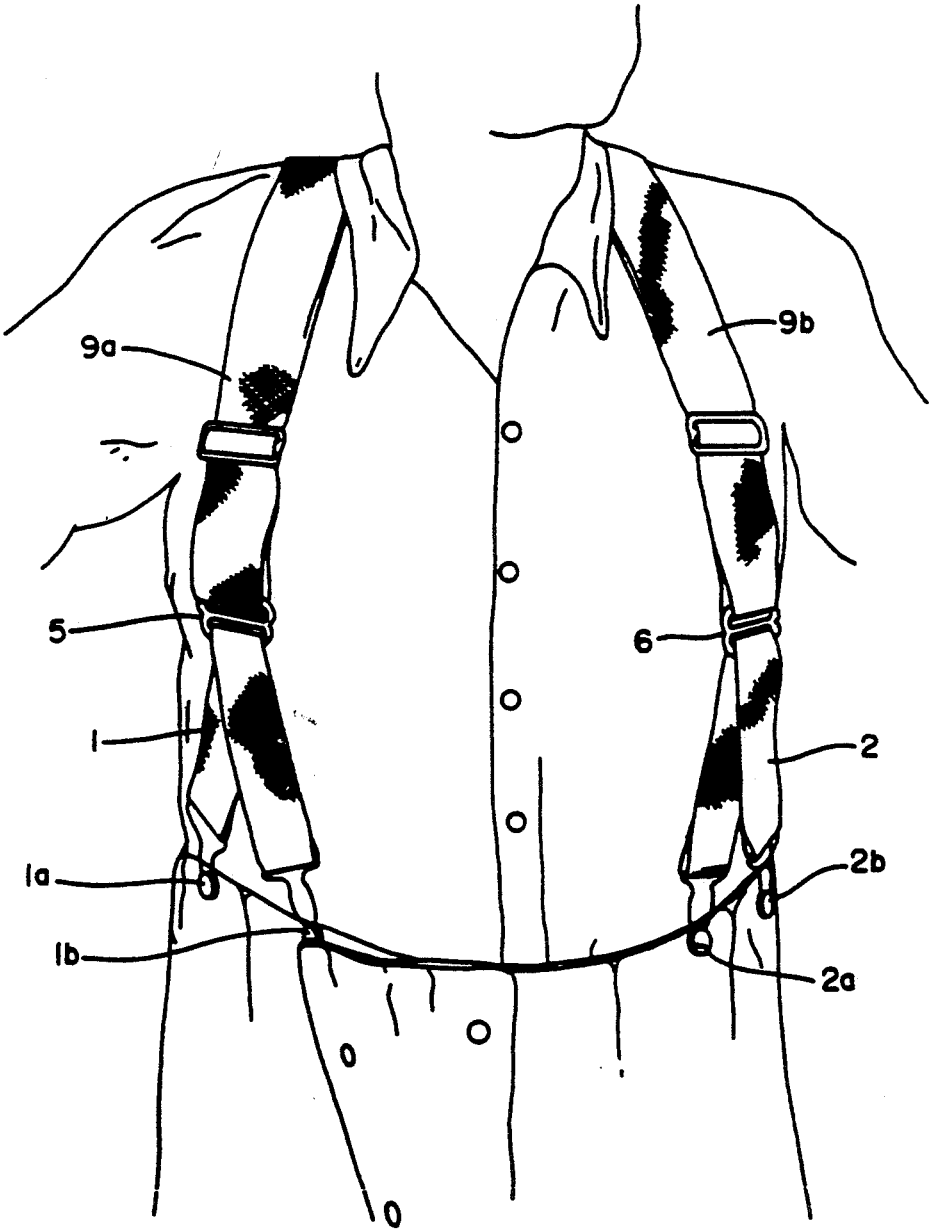
FIG. 1 is a front view of a firefighter torso wearing bunker pants supported by the suspenders.

The suspenders of the invention are designed to be adjustable in the front and rear to fit all body types. The shoulder straps of the suspenders of the invention are constructed of a wide, non-elastic, durable and preferably fire resistant, webbing with a long life-expectancy. The webbing can be cotton, nylon or other natural or synthetic fiber and will typically be 2.0 inch wide and approximately 0.075 inch thick although dimensions are not critical. The selection of a suitable web material should be evident to those familiar with the design of heavy industrial clothing and/or firefighter's equipment that may be the subject of NFPA standards or other government regulation (NFPA, Publications Office, Batterymarch Park, Quincy, Mass. 02269). The use of the wide webbing material aids in the even distribution of weight of the heavy firefighters' pants, which may become increasingly heavy when water-soaked or when pant's pockets have been filled with heavy contents. Forged button loop-fasteners affix the suspenders to the bunker pants and double loop-connectors permit adjustability.

The invention provides firefighters' suspenders for bunker pants consisting of a first long strap of a non-elastic webbing material which is threaded through the upper half of a first double loop connector, then pulled back in the same direction and apart to create two straps segments of equal length forming a "V". The strap segments are fixedly attached to each other at the point of the "V" and are adjustable in length at the end sections thereof by means of the slipping and tightening of the webbing threaded through a double loop adjustment means. The end sections of the "V" form the front of the suspenders. A second relatively shorter strap of non-elastic webbing material is threaded through the lower half of the first double loop-connector and is freely movable and slidable there through to form two short straps on either side of the loop in the shape of an inverted "V" at the back of the suspenders.

Four elastic straps are each located at the four ends of the non-elastic webbing straps forming the "V" and the inverted "V", and are attached to the non-elastic webbing by double loop-connectors. These strap sections are formed from an elastic material that has a predetermined limit of stretch. Eight button loop connectors are attached at ends of the four elastic straps and are attachable to buttons on firefighters' bunker pants.

The shorter elastic straps are threaded through the double loop connector at the ends of the "V"s, then threaded through the button loop-fasteners. The strap may be pulled back to the double loop connectors and sewn, to create a double thickness elastic strap portion at the end of each of the front and back suspender straps, whereby the button loop-fasteners attached to the ends of the four elastic strap-ends are attachable to buttons on firefighters' bunker pants.

The suspenders allow a full range of physiological body motion in combination with firefighters' bunker pants. The back webbing is slidable through the back loop and serves as a pivot, the limit of stretch of the connecting elastic ends of the straps likewise permits elastic movement, but is limited and suppresses "bounce."

Figure 2:
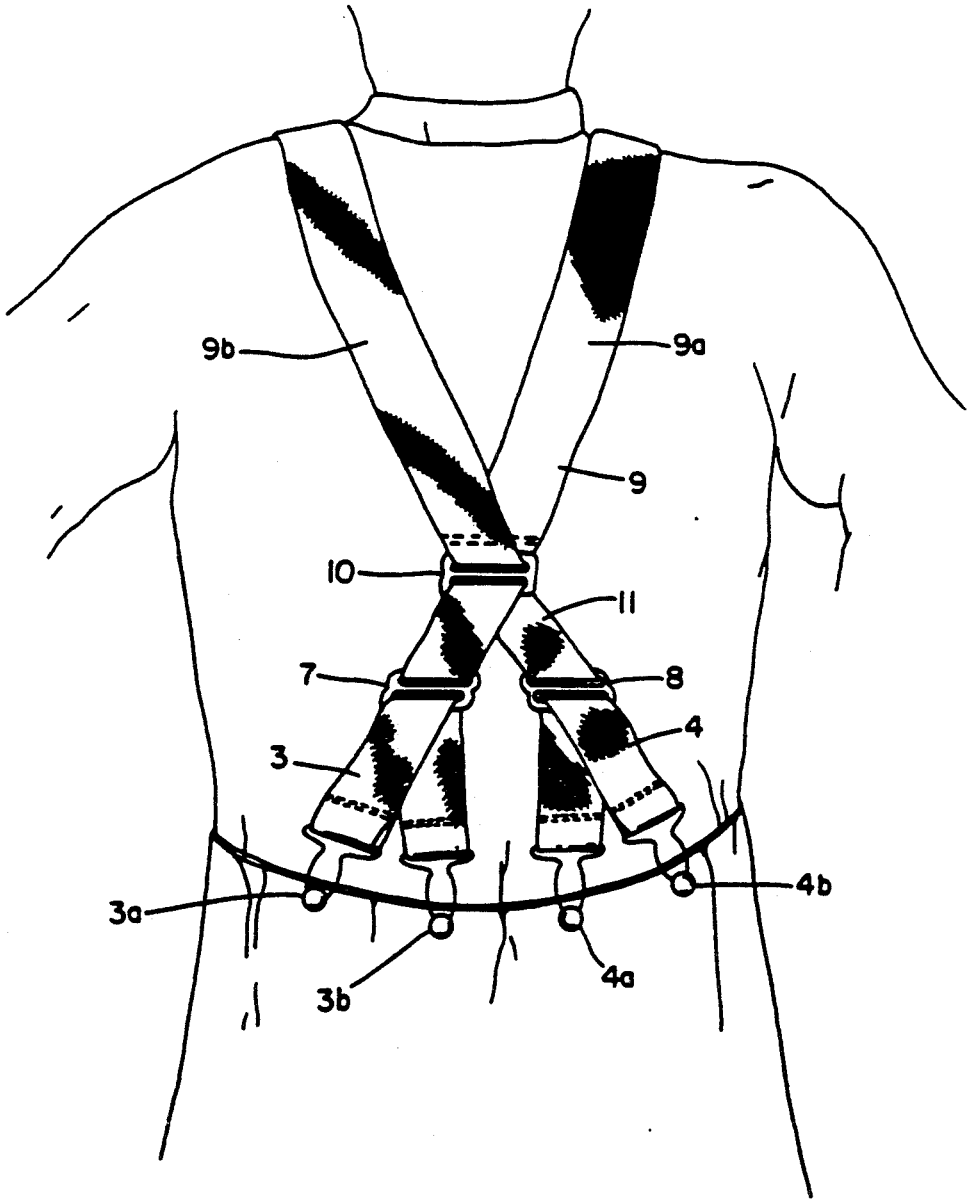
FIG. 2 is a rear view of the suspenders shown in FIG. 1.
Figure 3:
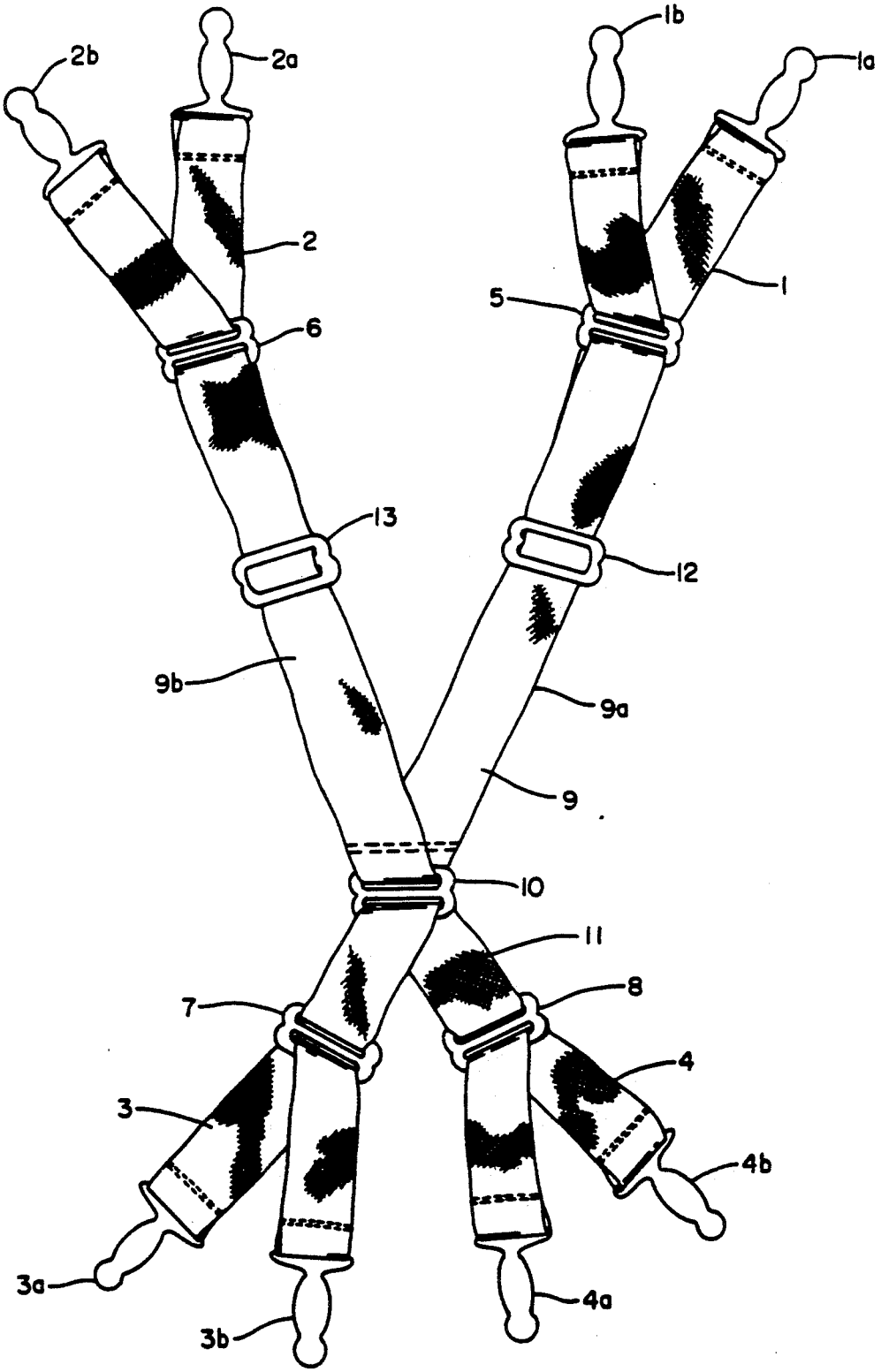
FIG. 3 is a plan view of the suspenders.

With reference to FIGS. 1 and 2, wide, heavy-duty elastic material is used for the lower portion of the straps located at all four ends of the suspenders 1, 2, 3 and 4 to allow for a limited degree of flexibility and freedom of movement during all ranges of body motion while providing continuous shape retention. The lower elastic portions of the suspenders are wide straps of elastic freely passing through one loop of double wire loop-connectors 5, 6, 7, and 8 to form attachment portions of strap for bunker pants. The elastic loops are formed of a webbing 1.5 inch wide and normally about 0.1 inch thick. Each side section is normally 5.5 inch long, relaxed, and 8.5 inch long fully extended. The length limit is the limit of elasticity and the lower section will not stretch beyond the 8.5 inch length. The strength characteristic of the elastic portions should correspond to that of the shoulder strap webbing as required in a particular application. Secured to the second loop of the double loop connector is a shoulder strap 9 formed of a single length strap and having segments (for reference) 9A and 9B. The central portion of the strap is fixedly secured to one loop of a double loop fastener 10 and a second strap segment 11 freely passes through the second loop of the fastener. The ends of strap 11 are secured to loop fasteners 7 and 8 that are attached to elastic bunker pants securing means 3 and 4.

At the end of each elastic portion of the strap 1, 2, 3 and 4 are forged wire button loop-fasteners 1a, 1b, 2a, 3a, 3b, 4a and 4b which are conventionally adjustable by carefully applying pressure at the junction of the attachment nipple, with a pair of pliers. The elastic portion of the straps is of double thickness, having been looped through the button loop-fasteners, doubled and then attached by means of sewing at the double loop-connectors.

Forged double-loop connectors, which are rust-resistant, are used in the assembly of the suspenders of the invention on the front of each should strap for durability and long life-expectancy. The double loop-connectors 12 and 13 on sides 9A and 9B of the straps allow the wearer to adjust the length of the suspenders by the sliding up or down of the webbed material of the straps through the loop-fastener to insure proper fit for the wearer. The sliding adjustment mechanism is conventional to suspenders.

The two shoulder straps of the invention are constructed of one 2" wide length of webbing which is looped through the upper half of a forged double loop-connector which fits approximately in the center of the suspender wearer's back. The one strap extends across one shoulder, through the loop-connector, and up across the other shoulder, and when pulled through the loop-connector forms a V-shape. The strap is held securely in place by means of being sewn with a durable, heavy-duty thread in a lock stitch.

Figure 4:
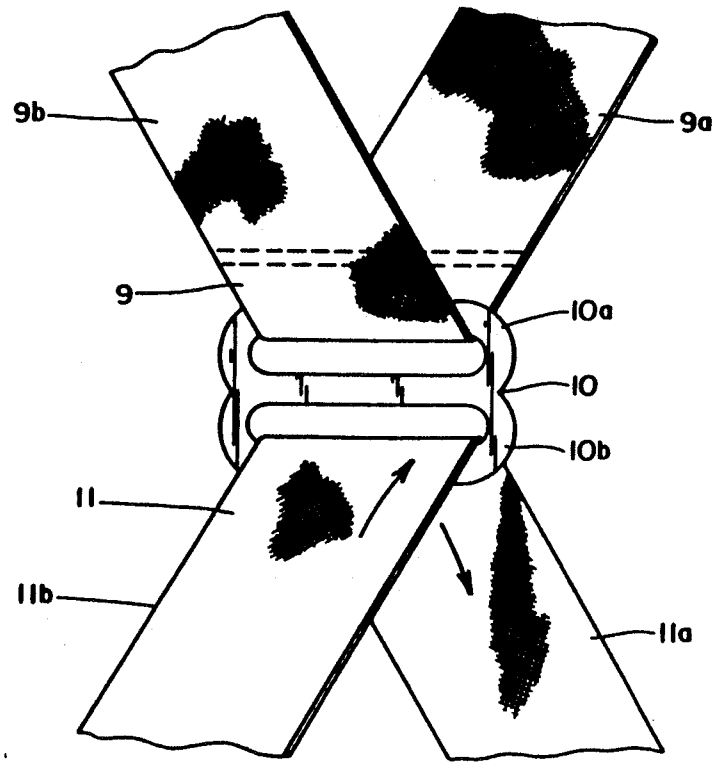
FIG. 4 is a detail view of the back pivot of the suspenders.

Threaded through the lower half of the loop-connector is a shorter piece of 2" wide webbing which is not secured by means of sewing, but adjusts by means of a sliding action through the loop as shown by the arrows in FIG. 4, which occurs during the body motion of the suspender wearer. The sliding or pivoting action of the lower portion of strap allows for full maneuverability of the wearer during twisting, turning, bending and other body movements. The straps of the suspenders move interactively with the body motion of the wearer, because of the floating pivot point which is provided by the unsecured, free-floating strap threaded through the double loop-connector on the lower back of the suspenders forming an inverted "V". A pivoting action of the "free-floating" strap threaded through the loop-connector results.

FIG. 4 shows a detail of the back pivot of the suspender assembly. Front strap 9 is secured by a lock stitch to first loop 10a of a double loop fastener 10, fixing frame segments 9A and 9B of strap 9 in a securely attached manner to the loop fastener. Strap 11, however, is freely passable through the second loop 10b of the fastener 10; and thus opposite side sections of strap 11, 11A and 11B vary in respective length (or pivot) according to body movement.

Figure 5:
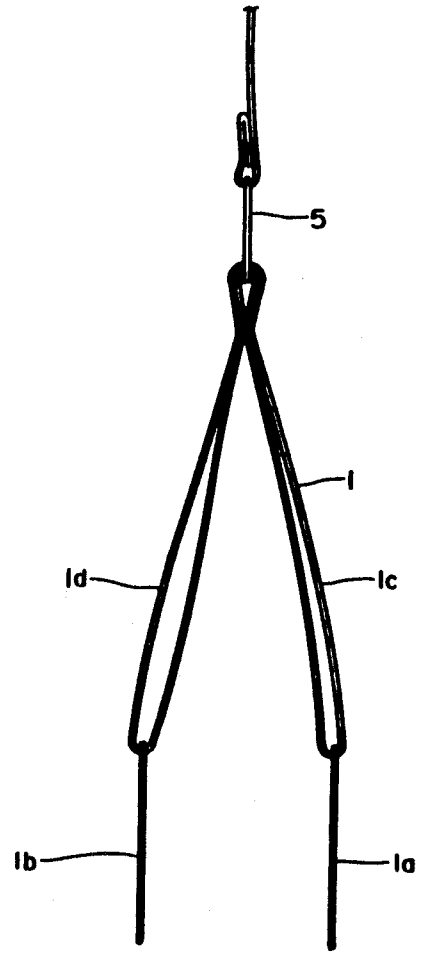
FIG. 5 shows a cross section of the pants securing section of the suspenders.

FIG. 5 shows a detail in cross section of the pants securing section of the suspenders 1, 2, 3 and 4, each of which is essentially identical. The bunker pants attachment loops 1a and 1[a]*b* are fully movable within loops of elastic material 1c and 1d formed by strap 1. Thus, an elastic movement, as well as pivot movement, is permitted.

Loops 12 and 13 are conventionally placed length adjustment loops of the type commonly used in suspenders and permit the nominal length of the suspenders to be adjusted in a conventional manner by sliding one end of the strap upwards or downwards with respect to the strap itself.

The invention provides firefighters or others engaged in rigorous activities with durable, heavy duty suspenders which are comprised of 2" wide webbing straps for even weight distribution, heavy-duty elastic, double thickness lower straps for flexibility and freedom of movement and a pivoting section where the shoulder straps are connected with the lower back straps. The loop-connectors and button loop-fasteners are made of a durable, forged rust-resistant metal which provides a long life-expectancy for the suspenders. The suspenders of the invention allow for the flexibility to perform normal fire fighting or other rigorous movements comfortably and more safely. The need for additional waist adjustment straps or belts to aid in the support of heavy bunker pants is eliminated, because of the durability of the suspenders and the flexibility of movement allowed during a full range of body motions. The wearer is more comfortable because of improved air circulation and ventilation around the waist area during normal fire fighting or other rigorous activities without the use of waist adjustment straps or a belt. The user is able to wear looser fitting protective trousers which increases the protective insulative dead air space between the garment and the wearer's body. In addition, the wearer's mobility is less restricted because of the flexibility of movement which is created by the sliding action of the back straps at the connecting point of the shoulder and bottom-back straps of the suspenders. The durability of the wide webbing and the use of limited segments of wide, double-thickness elastic material at the ends of the suspenders eliminate discomfort and inconvenience that may be encountered in traditional elastic suspenders. By maintaining a proper fit, mobility in action and comfort, is increased.

In its preferred embodiment, specifications for the suspenders require that the suspenders should support heavily loaded or water-soaked bunker pants without relying on adjustments or take-up straps at the pant waist, while providing enough flexibility to perform normal fire fighting movements comfortably. The specific webbing and elastic materials should be evident to those familiar with requirements for firefighting apparel that may be regulated by various federal, state and local governments or agencies or professional associations.

What is claimed is:

1. Suspenders, comprising:

A. a first long strap of a non-elastic webbing material which is threaded through an upper first loop of a first double loop connector, then pulled back in the same direction and spread apart to create two front strap segments of substantially equal length forming a "V", said strap segments being fixedly attached to each other at an intersection point of the "V" and including at end sections of said strap segments means for adjusting the extending length of each segment;

B. a second relatively shorter strap of non-elastic webbing material which is threaded through a lower second loop of said first double loop-connector and is freely movable and slidable therethrough to form two short rear strap segments extending on either side of the lower second loop in the shape of an inverted "V", such that said inverted "V" strap is freely floating through said first double loop connection, the end sections of said inverted "V" respectively threaded through an upper first loop of a second double loop connector and an upper first loop of a third double loop connector;

C. four elastic straps formed from an elastic material that has a predetermined limit of stretch, each one separately attached to the end of the four non-elastic webbing strap segments forming the "V" and the inverted "V" that are connected by said first double loop connector, said elastic straps each being attached to the end of one of said four non-elastic webbing strap segments through said second double loop connector, said third double loop connector, a fourth double loop connector, and a fifth double loop connector, respectively, which divide the elastic straps into two segments each end of which is connected to a button loop-fastener, whereby strap segments extending through a second loop of said second and third double loop connectors are freely movable and slidable through the loop of said connector such that said straps are freely floating therethrough; each of said elastic straps being threaded through respective second loops of said second, third, fourth and fifth double loop connectors; threaded through a button loop-fastener and having end segments thereof folded upon themselves to create a double thickness elastic strap portion at the opposite ends of each elastic strap in which the button loop fastener is fixedly maintained in the fold, whereby eight button loop fasteners are attached at ends of said four elastic strap segments and said button loop fasteners are in turn attachable to button on pants.

2. The suspenders of claim 1 attached to firefighters bunker pants.

*3. Suspenders, comprising:*

*A. a first long strap made of a non-elastic material which is threaded through a first connector, to create two front strap segments of substantially equal length forming a "V";*

*B. a second relatively shorter strap which is threaded through said first connector and is freely moveable and slideable therethrough to form two short rear strap segments extending on either side of said first connector in the shape of an inverted "V", the end sections of said inverted "V" respectively threaded through a second connector and a third connector;*

*C. four elastic straps separately attached to the ends of the four strap segments forming the "V" and the inverted "V", said four elastic straps each being threaded through said second connector, said third connector, a fourth connector and a fifth connector, which divide the four elastic straps into two segments, forming four more inverted "V" shapes, each end of said four elastic strap segments equipped for connecting to pants.*

* * * * *